UNITED STATES PATENT OFFICE.

ROBERT W. LESLEY, OF PHILADELPHIA, PENNSYLVANIA.

MANUFACTURE OF CEMENT.

SPECIFICATION forming part of Letters Patent No. 397,373, dated February 5, 1889.

Application filed June 30, 1888. Serial No. 278,699. (No specimens.)

*To all whom it may concern:*

Be it known that I, ROBERT W. LESLEY, of Philadelphia, in the State of Pennsylvania, have invented certain new and useful Improvements in the Manufacture of Cement, of which the following is a specification.

My invention consists of a new process of making from slags a cement which shall be of the quality of Portland cement.

This process may be stated as follows: I take the slag in molten condition as it runs from the blast-furnace, (having first ascertained by analysis the chemical constituents of the slag,) and I lead it through conduits wherein its temperature is reduced to, say, from 1,000° to 1,500° Fahrenheit into a cupola or other receiver. I then add to this molten slag the ingredients needed to bring it up to the proportions of a Portland cement, the ingredients being in heated condition, and being blown through tubes—for example, as tuyeres—into the mass by a Whitwell or other suitable hot blast at a temperature of, say, 1,200° Fahrenheit, more or less. A good Portland cement should analyze from fifty-eight to sixty per cent of lime, from twenty to twenty-six per cent. of silica, from eight to twelve per cent. of alumina and iron, and varying proportions of soda, potash, &c.; and slags are to be found which will analyze: silica, 36.2 per cent.; alumina, 11.10 per cent; lime, forty-eight per cent.; magnesia, 1.4 per cent., and the balance of ingredients not affecting the use of the material for a cement. This lime is the principal ingredient required to bring the slag up to the proportions of Portland cement, although in some cases an addition of silica or alumina may be requisite, and in other cases a small addition of the alkalies, potash, and soda may be of benefit. In order to introduce the additional lime into the fluid slag, I, as before said, blow it into the mass by means of a hot blast. For this purpose the lime can be supplied in regulated quantity through tubes, which shall enter the blast tubes or tuyeres at a short distance from the point where they discharge into the cupola containing the slag. I prefer to use slaked lime for the purpose, because it is in the condition of a powder much finer than can be produced by any mechanical process of grinding or reduction. This pulverulent lime is taken by the hot blast, and is blown into the body of the fluid slag at a temperature which prevents chilling of the slag, and is that at which the lime will unite with the slag chemically to form silicates of alumina and lime. There is thus an intimate mixture and chemical union of the slag and the added ingredients, the blast serving to blow these ingredients into and through the mass, and at the same time to maintain the charge at the temperature requisite to effect the chemical union or combination of the same. When the proper proportion of lime to the charge of slag has been driven into the mass, the material thus formed is drawn off from the furnace in fluid form, is granulated by being run into cold water or by being sprinkled with water, and this product then is ground or otherwise mechanically reduced to powder. If silica or alumina are to be added, they can be added in the same way as the lime. The lime, instead of being slaked, can be in the form of caustic lime, if desired.

In lieu of lime powder I can use the lime or other added ingredients in the form of a paste, which is vaporized by driving it with steam (preferably superheated) into the hot-air blast. The hot-air blast at once dissipates the water-vapor and carries the impalpable lime or other solid residue into the molten slag. I thus present to the fluid slag the lime or other materials at about the temperature of the slag itself, and this causes a prompt and thorough intermingling of the atoms under conditions most favorable for the desired chemical reaction.

I have set forth the details of the process which I prefer to employ. It is feasible, however, to inject the material into and through the fluid slag by means of a non-heated blast. In this event the pulverulent ingredients thus added would really be brought to heated condition by the time they were driven throughout the slag; but it would be advisable in such case, in order to avoid possibility of chilling the charge, to have fire or fuel in the furnace containing the same, or to provide some extraneous means for maintaining the charge at the desired temperature. By the injecting operation the added ingredients are driven into and diffused throughout the fluid slag at the high temperature suitable to cause their intimate and chemical union.

I am aware that it is not new, broadly considered, to add lime to molten slag for cement-making purposes. This has before been suggested by others and is not claimed by me; but I am not aware that it has ever before been attempted or suggested to inject or blow the lime into and throughout the mass of slag in the manner and under the conditions hereinbefore expressed. The advantages and the improved result due to this mode of procedure, as well as to the process of manufacture as a whole, have been already stated, and need not be repeated here.

Having described my improvement, what I claim as new and of my own invention is as follows:

1. In the manufacture of cement from slags, the method of incorporating with the slag lime or other ingredients in the proportions necessary to bring the slag to a composition of Portland cement, which consists in injecting into slag heated to fluid condition the lime or other ingredients in finely-divided condition and at a high heat, substantially as specified.

2. The described process of making Portland cement, which consists in taking the molten slag drawn off from iron-furnaces, injecting into the slag while still fluid highly-heated and finely-divided lime or other ingredients, the mass being maintained at the temperature at which said heated ingredients will chemically combine or unite with the slag, then running this fluid product or mixture into water or sprinkling it with water, so as to bring it to granular condition, and finally reducing this granular material to a powder, substantially as hereinbefore set forth.

In testimony whereof I have hereunto signed my name this 30th day of June, A. D. 1888.

R. W. LESLEY.

Witnesses:
   EWELL A. DICK,
   M. BAILEY.